US006965948B1

(12) United States Patent
Eneborg et al.

(10) Patent No.: US 6,965,948 B1
(45) Date of Patent: Nov. 15, 2005

(54) METHOD AND APPARATUS FOR SELECTIVE NETWORK ACCESS

(75) Inventors: Mats Eneborg, Skäholmen (SE); Annika Jonsson, Skarpnäck (SE); Andras Valko, Budapest (HU); Tony Larsson, Stockholm (SE); Martin Körling, Bagarmossen (SE); Philippe Charas, Upplands Väsby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/438,431

(22) Filed: Nov. 12, 1999

(51) Int. Cl.$^7$ .............................................. G06F 15/16
(52) U.S. Cl. ..................................... 709/250; 709/227
(58) Field of Search ............................... 709/225, 229, 709/236, 238–242, 227–228, 235, 250, 237; 370/352, 401; 379/211.02

(56) References Cited

U.S. PATENT DOCUMENTS

| | | | | |
|---|---|---|---|---|
| 5,774,668 A | * | 6/1998 | Choquier et al. | 370/480 |
| 5,875,186 A | * | 2/1999 | Belanger et al. | 370/331 |
| 5,933,425 A | * | 8/1999 | Iwata | 370/351 |
| 6,078,946 A | * | 6/2000 | Johnson | 709/200 |
| 6,321,260 B1 | * | 11/2001 | Takeuchi et al. | 709/223 |
| 6,345,303 B1 | * | 2/2002 | Knauerhase et al. | 707/10 |
| 6,426,955 B1 | * | 7/2002 | Gossett Dalton et al. | 370/401 |
| 6,434,139 B1 | * | 8/2002 | Liu et al. | 370/352 |
| 6,522,881 B1 | * | 2/2003 | Feder et al. | 455/437 |
| 6,535,493 B1 | * | 3/2003 | Lee et al. | 370/329 |
| 6,580,700 B1 | * | 6/2003 | Pinard et al. | 370/332 |
| 6,600,738 B1 | * | 7/2003 | Alperovich et al. | 370/352 |

FOREIGN PATENT DOCUMENTS

GB 2 294 844 A * 5/1996
WO WO97/40638 * 10/1997

OTHER PUBLICATIONS

Papadopouli, M. et al., "Connection Sharing in an Ad Hoc Wireless Network among Collaborating Hosts", ☐☐ The Internet Real-Time Library at Columbia University.*
Haartsen, J., "Bluetooth—The universal radio interface for ad hoc, wireless connectivity", The Ericsson Review No. 3, 1998, p. 110-117.*
Albrecht, M. et al., "IP Service Over Bluetooth: Leading the Way to A New Mobility", ☐☐ Proceedings of the Conference on Local Computer Networks, Oct. 1999, pp. 2-11.*

(Continued)

Primary Examiner—Abdullahi E. Salad (57) ABSTRACT

A method and apparatus for providing selective access to a network, between an end device and a network such as the Internet through one or more access network terminating devices includes determining an access capability for each access network terminating device and comparing the access capability with a preferred access capability associated with a user preference. Best access is determined based on a comparison of the capabilities of the access network terminating devices and the preferred capabilities. Once a match is found, one of the access network terminating devices is selected based on the comparison and the end device is configured according to the access capability of the selected one of the access network terminating devices. Access capabilities include, for example, cost of access, coverage area, and QoS. While communicating with the network the end device continues to detect if new access network terminating devices are available. The access capability for each of the new access network terminating devices is determined and compared with the preferred access capability and/or the current access capabilities being provided to the end device. One of the new access network terminating devices can be selected based on the comparison and the end device configured according the access capability of the new access network terminating device.

16 Claims, 4 Drawing Sheets

OTHER PUBLICATIONS

Egevang, K. et al., The IP Network Address Translator (NAT):, IETF RFC 1631, May 1994.*

Albrecht, M. et al., "IP Services Over Bluetooth: Leading The Way To A New Mobility", Proceedings of the Conference on Local Computer Networks, Oct. 1999, pp. 2-11, XP002130784.

Papadopouli, M. et al., "Connection Sharing In An Ad Hoc Wireless Network Among Collaborating Hosts", The Internet Real-Time Library at Columbia University.

Haartsen, J., "Bluetooth—The Universal Radio Interface For Ad Hoc, Wireless Connectivity", The Ericsson Review, No. 3, 1998, pp. 110-117.

Perkins, C., "IP Mobility Support", IETF RFC 2002, Oct. 1996.

E.W. Dijkstra, "A Note on Two Problems in Connection with Graphs," Numerische Mathematik 1, pp. 269-271, 1959.

E.L. Lawler, "A Procedure for Computing the K Best Solutions to Discrete Optimization Problems and its Application to the Shortest Path Problem," Management Science, vol. 18, pp. 401-405, Mar. 1972.

S.-W. Lee et al., "A K-Best Paths Algorithm for Highly Reliable Communication Networks," IEICE Trans. Communications, pp. 586-590, 1999.

S.D. Nikolopoulos et al., "Addressing Network Survivability Issues by Finding the K-best Paths Through a Trellis Graph," Proc. of IEEE Infocom, pp. 1-8, 1997.

A. Shaikh et al., "Efficient Precomputation of Quality-of-Service Routes," Proc. Workshop on Network and Operating Systems Support for Digital Audio and Video, 16 pages, Jul. 1998.

A. Orda et al., "QoS Routing: The Precomputation Perspective," Proc. of IEEE Infocom, 9 pages, 1999.

M. Peyravian et al., "Network Path Caching: Issues, Algorithms and a Simulation Study," Computer Communications, 20(8), pp. 605-614, Aug. 1997.

M. Kodialam et al., "Minimum Interference Routing of Bandwidth Guaranteed Tunnels with MPLS Traffic Engineering Applications," Proc. of IEEE Infocom, pp. 1-16, 2000.

S. Suri et al. "Profile-Based Routing: A New Frame work for MPLS Traffic Engineering," Proc. of QofIS, pp. 1-2, 2001.

D. Awduche et al., "Extensions to RSVP for LSP Tunnels," RFC3209, pp. 1-3, Dec. 2001.

L. Andersson et al., "Label Distribution Protocol Specification," RFC3036, pp. 1-17, Jan. 2001.

Z. Wang et al., "Quality-of-Service Routing for Supporting Multimedia Applications," IEEE Journal on Selected Areas in Comm., vol. 14, No. 7, pp. 1228-1234, Sep. 1996.

A.V. Goldberg et al., "A New Approach to the Maximum-Flow Problem," Journal of the Association for Computing Machinery, vol. 35, No. 4, pp. 921-940, Oct. 1988.

S. Acharya et al., "Architecting Self-Tuning Optical Networks," Proceedings of the European Conference of Optical Communications, 2 pages, Sep. 2002.

D. Katz et al., "Traffic Engineering Extensions to OSPF Version 2," Network Working Group, IETF, pp. 1-14, Oct. 2002.

D.H. Lorenz et al., "QoS Routing in Networks with Uncertain Parameters," IEEE/ACM Transactions on Networking, vol. 6, No. 6, 8 pages, Dec. 1998.

* cited by examiner

METHOD AND APPARATUS FOR SELECTIVE NETWORK ACCESS

BACKGROUND

The present invention relates to telecommunications and data communications, and more particularly to a method and apparatus for providing end devices with network access (e.g., Internet access) by selecting from a plurality of network terminating devices and corresponding access networks.

For connecting an end device (e.g., a phone, computer, appliance, vending machine, car, etc.) to the Internet and associated networking environments in existence today, there is a wide choice of different access mechanisms including fixed access, cellular access, WLAN access, satellite access, and the like, which are available to provide access to the IP network. In order to use an access mechanism, a network terminating device is needed to connect the end device to the access network and, through the access network, to the Internet. For example, a cable or wire pair are examples of a network terminating device associated with a fixed access network through which an end device can be connected to, e.g., the Internet. Likewise, a cellular phone is an example of a network terminating device associated with the cellular wireless access network, which provides another route for end devices to be connected to the Internet. Yet another example is a PCMCIA card for WLAN network access which also may be used by an end device to communicate with the Internet. Those skilled in the art will recognize many other examples of network terminating devices and their corresponding access networks through which end devices may reach other networks.

For many end devices, it would be desirable to be able to use different access mechanisms (i.e., network terminating devices and access networks) for different connection situations, depending on factors including, for example, availability, pricing, bandwidth and the like. However, many end devices are configured to use only one type of access mechanism. For example, many personal computers can only connect to the Internet via a wireline modem and the fixed telephone access network.

In order to use different access mechanisms, an end device must have a network terminating device for each access network. Therefore, for end devices such as a laptop computer, either several network terminating devices are required to be permanently installed in the laptop or network terminating devices have to be disconnected and reconnected to the laptop each time a different access mechanism is desired. A problem arises in that if network terminating devices must be disconnected and reconnected it is difficult to determine for any given point in time which access mechanism provides the best quality connection to the ultimate network of interest, e.g., the Internet.

Providing such a determination was attempted in the BARWAN project at the University of California at Berkeley. In the BARWAN project, a laptop was equipped with access mechanisms including, for example, IR, WLAN (both of which were used to access a LAN), Ricochet, CDPD and satellite interfaces. The access mechanism that could offer the best quality for the moment was used for data transfer. Since each of the access mechanisms provided different coverage, different access mechanisms were used depending on where the user was located, for example, at the office, in the car, and the like. Again, however, the difficulty with such a system is that a separate network terminating device was provided directly to the end device for each access mechanism leading to the need for additional hardware and correspondingly higher costs. Moreover, given that space and power consumption, for example, are important considerations for end devices such as cellular phones and laptops, additional disadvantages may be posed by the additional hardware required to provide a separate network terminating device for each access mechanism.

More flexibility and lower cost would be possible in such a system, particularly in a multi-user environment such as an office, where sharing of such network terminating devices is possible. Sharing may require, for example, a wireless interface between each of the end devices and the network terminating devices, so that the network terminating devices can be "shared" among many users. In this way a user can make use of whatever access network terminating device is available at a given point in time, without the need for a direct, physical connection to each network terminating device. Such an approach to sharing has been studied at the Internet Real-time Laboratory at Columbia University and was summarized in a paper entitled "Connection Sharing in an Ad Hoc Wireless Network Among Collaborating Hosts", by M. Papadopouli, and H. Schulzrinne, (http://www.cs.columbia.edu/-maria/nossdav99 final.ps).

In the Columbia project, a framework for collaborating among hosts to share a limited number of network connections with each other is being contemplated. The goal is to increase a quality metric and data availability primarily by performing load balancing between different network terminating devices which might be available depending on the demand from the users in the shared environment. Each access device measures the traffic that passes through it and provides that information to the end devices so that the end devices can choose the access device which is least loaded. Such a system however, may not achieve the "best" possible access for a given end device, since different types of end devices and connections may have widely varying connection considerations in determining what constitutes a "best" access. For certain types of connections, available bandwidth may be a primary "best" access consideration, while for other types of connections low delay time might be paramount.

Another drawback of the system evaluated in the Columbia project is its usage of collaborating hosts which provides a uniform, but rigid, access opportunity for end devices. Instead, it would be desirable to provide a more flexible system wherein different types of end devices may have different selection criteria with respect to different types of network terminating devices and access networks. For example, some network terminating devices may be provided which offer access to anyone (i.e., public access points placed in airports, shopping malls, etc.), some network terminating devices may be provided which offer access to a specified group of people (i.e., employees of a particular company or participants in a particular conference) and some network terminating devices may be provided which offer access only to a particular end device. In such an environment, it would be desirable to permit an end device, particularly a mobile end device, to employ more sophisticated access network selection techniques so that a user can have preferred network accesses given various access options which might be available (e.g., "I want to use my own access devices whenever possible, and the cheapest public access device in all other cases").

Yet another drawback of the Columbia system is that once an end device is linked to an external network through one of the collaborating hosts, it continues to operate through that host for the duration of the connection. Even if that particular host was a good choice initially, it may not always provide the best possible connection for the entire time that the link is operative.

It would be desirable, therefore, to develop a method and apparatus which provide selective and flexible connectivity to a plurality of network terminating devices to select an access mechanism which provides a best possible access for each situation. Such a method and apparatus should provide access to, e.g., the Internet, without the need for a plurality of network terminating devices to be physically integrated into the end devices, and in a user friendly manner.

SUMMARY

To provide a flexible and adjustably optimal connection to a network, e.g., the Internet, a method and apparatus for selective access to a plurality of different access networks by end devices is disclosed. It is therefore an object of the present invention to provide a method and apparatus capable of providing selective access for each access situation as determined by, among other things, user preferences related to factors such as cost of service, quality of service, etc. and the capabilities of access networks available to the end device.

In accordance with one aspect of the present invention, the foregoing and other objects are achieved in a method and apparatus for providing selective access to a network, for example by linking an end device to the network via an access network using a network terminating device. The end device may (or may not) have a direct interface usable for data and/or voice communications. The end device is equipped with an indirect interface and uses the indirect interface to determine the access capability for each access network which is available to the end device. The access capabilities may include, for example, cost of access, coverage area, available bandwidth, delay and QoS. The determined access capability for each access network can be compared with a preferred access capability associated with the end device, or user thereof, wherein a particular access network can be selected based on, for example, how favorably the determined access capabilities of each access network compare with the preferred capabilities of the end device or user. Accordingly the preferred capabilities may also include cost of access, coverage area, available bandwidth, delay and QoS and both the actual access network terminating device capabilities and the preferred capabilities may include other factors such as the network type and the like. Based on the comparison, one of the access network terminating devices may be selected and the end device may be configured according to the access capabilities of the selected access network terminating device prior to connecting to the selected access network.

In accordance with a further embodiment of the present invention, the indirect interface may be also be used during the connection between the end device and the ultimate network to detect if new access network terminating devices are available to the end device. If new devices are detected, an access capability associated with each of the new access network terminating devices may be determined and a comparison may be made between the determined access capability associated with each new access network terminating device, the capabilities associated with the currently used access network terminating device and a preferred access capability associated with the end device. As in the previous embodiment, a decision to reselect among the available access network terminating devices is based on the comparison. If a better access for the end device is identified, the new access network terminating device is selected and the end device may be reconfigured according to the access capability associated with the selected new access network terminating device.

BRIEF DESCRIPTION OF THE DRAWINGS

The objects and advantages of the invention will be understood by reading the following detailed description in conjunction with the drawings, in which.

DETAILED DESCRIPTION

The various features of the invention will now be described with reference to the figures, in which like parts are identified with the same reference characters. In the following description, for purposes of explanation and not limitation, specific details are set forth, such as particular circuits, circuit components, techniques, etc. in order to provide a thorough understanding of the present invention. However, it will be apparent to one skilled in the art that the present invention may be practiced in other embodiments that depart from these specific details. In other instances, detailed descriptions of well-known methods, devices, and circuits are omitted so as not to obscure the description of the present invention.

In accordance with an exemplary embodiment of the present invention it is desired therefore, to combine a plurality of access mechanisms, fixed as well as mobile, to flexibly select a "best" possible access for each situation. This should be done without the need for a plurality of access network terminating devices being integrated into the end device, and in an easy way for the user.

Figure 1:
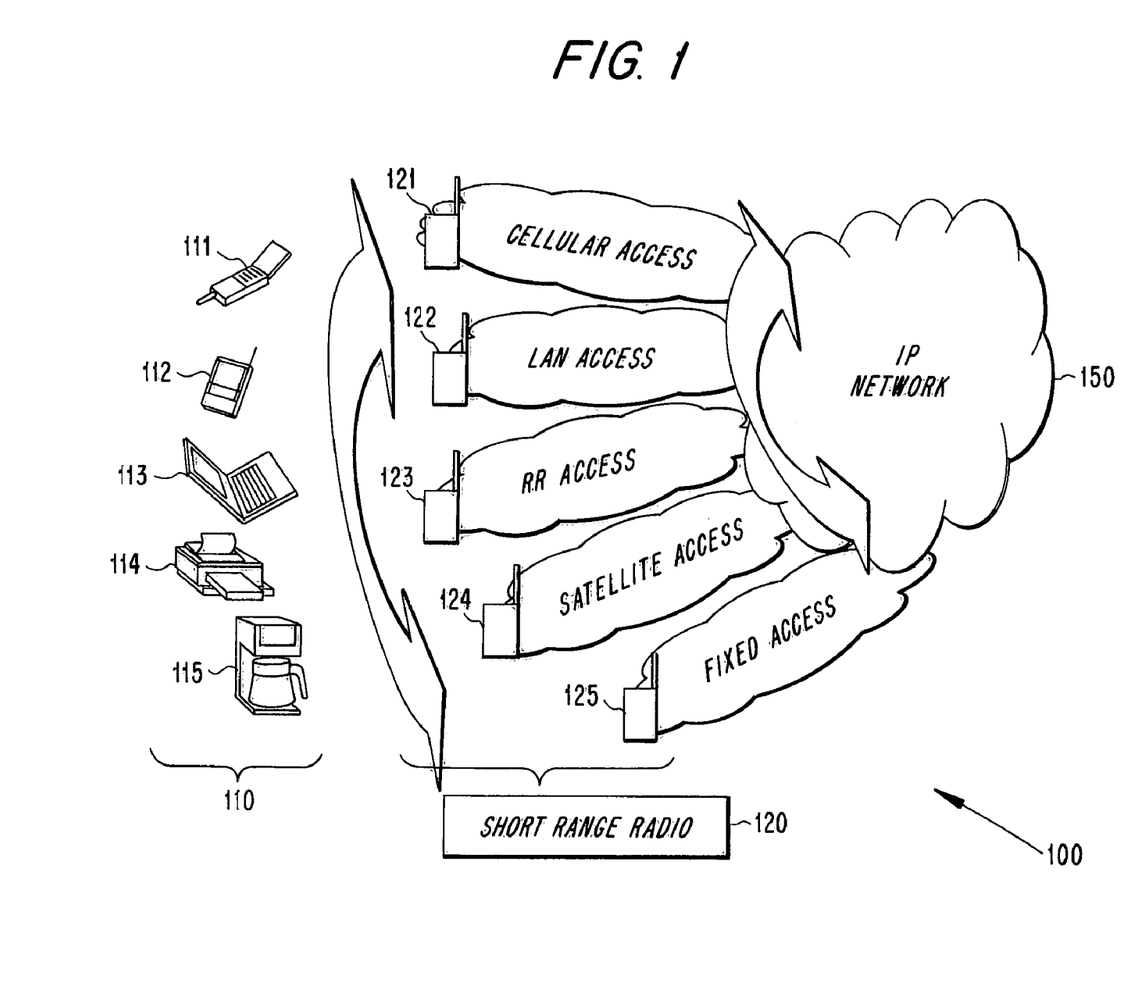
FIG. 1 is a diagram illustrating an exemplary access network environment.

FIG. 1 illustrates an exemplary system in which various end devices 110 are shown connected to an IP network 150, which IP network is for example the Internet or an Intranet. End devices 110 can come in many forms, for example, cellular phone 111, wireless palmtop computer 112, laptop 113, printer 114, and even intelligent household devices such as coffee pot 115. Those skilled in the art will appreciate that these are just a few examples of end devices which can be used in conjunction with the present invention. Access to IP network 150 can be made through an indirect interface 120, e.g., a short range radio interface such as that provided by Bluetooth technology. The interface 120 between the end devices 110 and the plurality of access network terminating devices 121–125 is referred to herein as an "indirect" interface because some of the end devices 110 may also have a direct interface for communicating with their traditional networks. For example, cellular phone 111 may have, as its direct interface, a GSM cellular interface. On the other hand some end devices 110, e.g., those which do not otherwise have a communication function such as coffeepot 115, may not have a direct interface.

Indirect interface 120 may be configured to interface with terminating devices 121–125 for any one of a number of exemplary network access mechanisms such as, for example, cellular access mechanism 121, LAN access mechanism 122, Ricochet access mechanism 123, satellite access mechanism 124, and fixed access mechanism 125. It is important to note that while specific access mechanisms may be described herein for exemplary purposes, it is contemplated that new access mechanisms or access mechanisms not specifically enumerated are within the scope of the present invention.

As was described above, indirect interface 120 may be embodied, for example, as a short range wireless transmission system. One example of such an interface is that defined by the recently developed "Bluetooth" technology which facilitates two-way data transmission. Bluetooth is a universal radio interface in the 2.45 GHz frequency band that enables portable electronic devices to connect and communicate wirelessly via short-range, ad hoc networks. Readers interested in various details regarding the Bluetooth technology are referred to the article entitled "BLUETOOTH—The universal radio interface for ad hoc, wireless connectivity" authored by Jaap Haartsen and found in the Ericsson Review, Telecommunications Technology Journal No. 3, 1998, the disclosure of which is incorporated here by reference. For the purposes of the present invention, only Bluetooth features of immediate interest are described here to avoid obscuring these exemplary embodiments. Moreover, the indirect interface 120 can be embodied using interfaces other than Bluetooth interfaces.

In this application of a Bluetooth system as an indirect interface for end devices, a Bluetooth transceiver (illustrated in FIG. 3) is associated with, for example, each of the plurality of network terminating devices 121–125. The transceiver may act as a master device and continuously transmit, for example, INQUIRE messages for receipt by any end device 110 that may be in the vicinity. Another Bluetooth transceiver, included in each end device 110, would respond to this transmitted message. End device 110 may then proceed through indirect interface 120 to lock on to a channel of the indirect interface 120.

Alternatively, the master/slave roles may be reversed and the Bluetooth transceiver of an end device 110 may send the INQUIRE messages to seek network terminating devices. Then, Bluetooth transceivers of network terminating devices within range of the end device 110 will respond to establish a Bluetooth link therewith in order to exchange capability information as described below. In this way, end devices 110 need only a single e.g., Bluetooth, indirect interface 120 to select any one of the plurality of access network terminating devices that are available within reach of indirect interface 120. If end device 110 knows what kind of access network terminating devices are available, it may compare factors such as cost, quality, and the like, associated with each available access network and choose the "best" one according to a selection scheme, as described in more detail below. The current values for these (and other) factors can be transmitted over the indirect interface 120 to the end device 110 for evaluation and selection.

Figure 2:
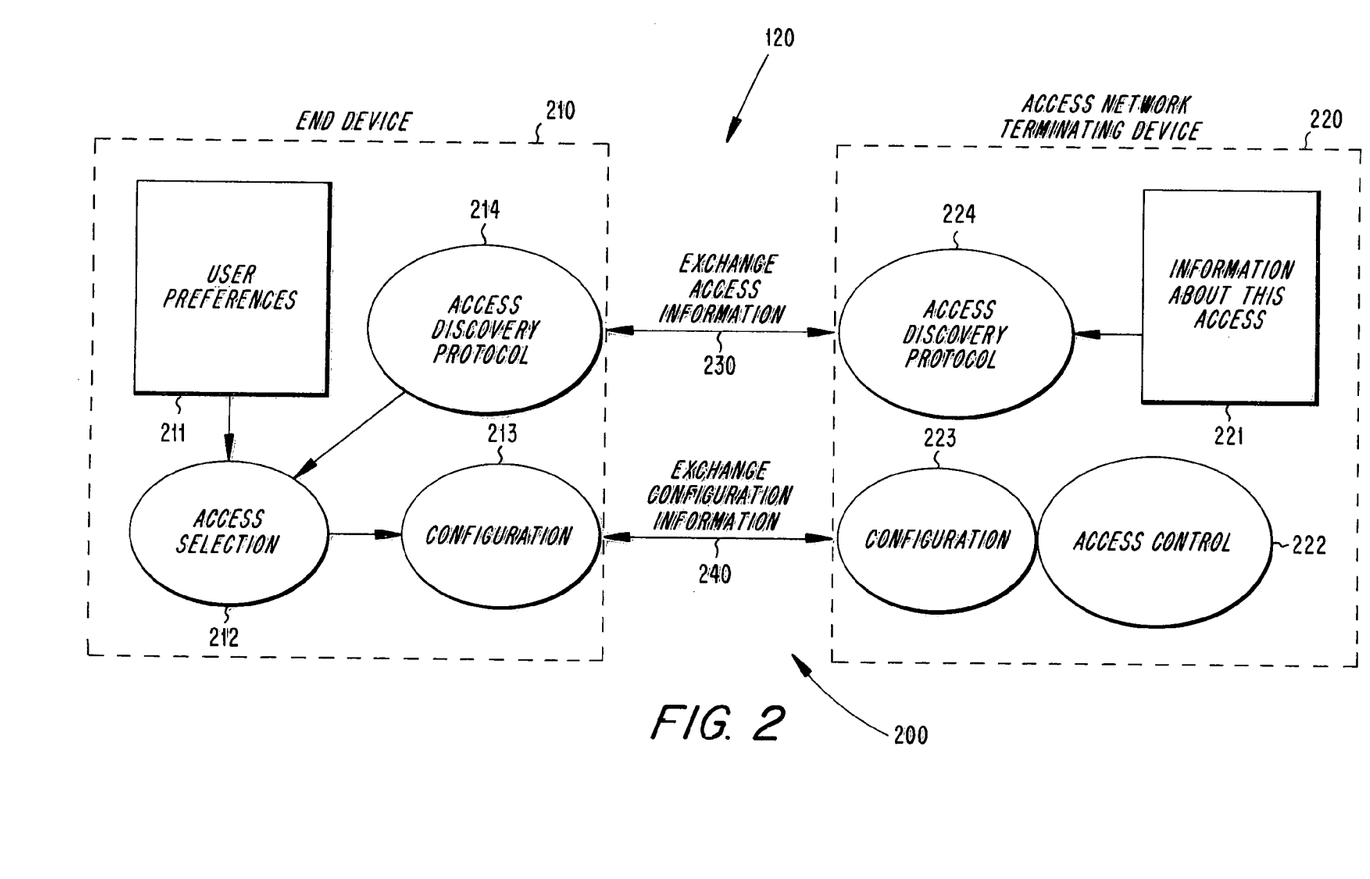
FIG. 2 is a block diagram illustrating an exemplary indirect interface between an end device and an access network terminating device in accordance with an exemplary embodiment of the present invention.

To better understand the configuration of the fixed and mobile or remote portions of indirect interface 120, reference is now made to FIG. 2 wherein a diagram illustrating an exemplary indirect interface between end device 210 and network terminating device 220 is shown. User preferences 211 may be kept in end device 210, e.g., stored in a local memory and updated by a user, and may be related to those factors (e.g. cost, QoS, and the like) considered by the user to be of greatest importance in selecting which access mechanism to use for communicating data with network 150. Prior to comparing user preferences 211 with corresponding capabilities of access networks, it is first determined which access mechanism(s) are available. Access discovery protocol blocks 214 and 224 perform the polling over the indirect interface 120 described above (in either direction) to identify the available access mechanisms for a particular end device 110. Thus, access discovery protocol blocks 214 and 224 also perform the initial "handshaking" needed to establish a communication link 230 between the end device 210 and the access network terminating device 220, e.g., by allocating a Bluetooth channel there between.

Current information about the network access available via network terminating device 220 may be kept in information block 221, which may be stored in a local memory, continuously updated, or the like. As part of the access discovery protocols performed by blocks 214 and 224, this information may be transferred to the end device 210 over link 230.

Information so obtained by end device 210 may be used for subsequent comparison to user preferences 211 in access selection step 212. When a suitable match is found between user preferences 211 and access information received from information block 221 related to the access characteristics of access network terminating device 220, that terminating device (and its corresponding access network) is selected. Then, configuration may begin with configuration block 213 establishing configuration information exchange 240 with corresponding configuration process 223 of access network terminating device 220.

This configuration information is used to ensure that data packets to be transmitted between end device 210 and the IP network 150 are routed correctly. For example, this configuration information can include an IP address associated with the selected access network, as well as other information, e.g., subnet, gateway, DNS server information, etc. The end device 210 can receive an IP address that is valid in the selected access network, in which case the end device 210 has a direct connection to the IP network 150 and can transmit and receive data packets directly therewith.

Alternatively, the end device 210 and the network terminating device 220 can agree on a dummy IP address associated with their connection (i.e., an IP address that is not valid in the access network) and the connection to the IP network 150 can be made using an IP address assigned to the network terminating device 220. Those skilled in the art will appreciate that there are many techniques available for configuring end device 210 and network terminating device 220 so as to provide an IP connection, any of which may be employed herein. However, the interested reader is directed to "The IP Network Address Translator (NAT)", IETF RFC 1631, to K. Egevang and P. Francis, May 1994, ftp://ftp.isi.edu/in-notes/rfc1631.txt, the disclosure of which is incorporated here by reference.

Alternatively, or additionally, if the network terminating device 220 and/or its corresponding access network support Mobile IP (see, for example, "IP Mobility Support" IETF RFC 2002, to C. Perkins, October 1996, ftp://ftp.isi.edu/in-notes/rfc 2002.txt, the disclosure of which is also incorporated here by reference), the end device 210 offers a so-called foreign agent to the network terminating device 220 as part of the configuration process. Using Mobile IP in this way is particularly advantageous in the context of the present invention since Mobile IP supports handover between foreign agents which means that ongoing TCP connections will not be broken if the end device 210 selects another network terminating device 220 during the connection.

Once end device 210 is properly configured, access may be attempted and granted from access network terminating device 220 by an appropriate exchange with access control block 222, which may require authorization and related registration procedures as are known in the art for gaining access to network 150.

It should be noted that in, general, three steps are performed to establish a network connection between end device 210 and, for example, network 150 as shown in FIG. 1. First, end device 210 discovers which of the plurality of access network terminating devices are available, then the "best" access mechanism to use for the present moment is selected based on the type of access network terminating devices found and the user's preferences, and finally configuration for the chosen access network is performed.

Figure 3:
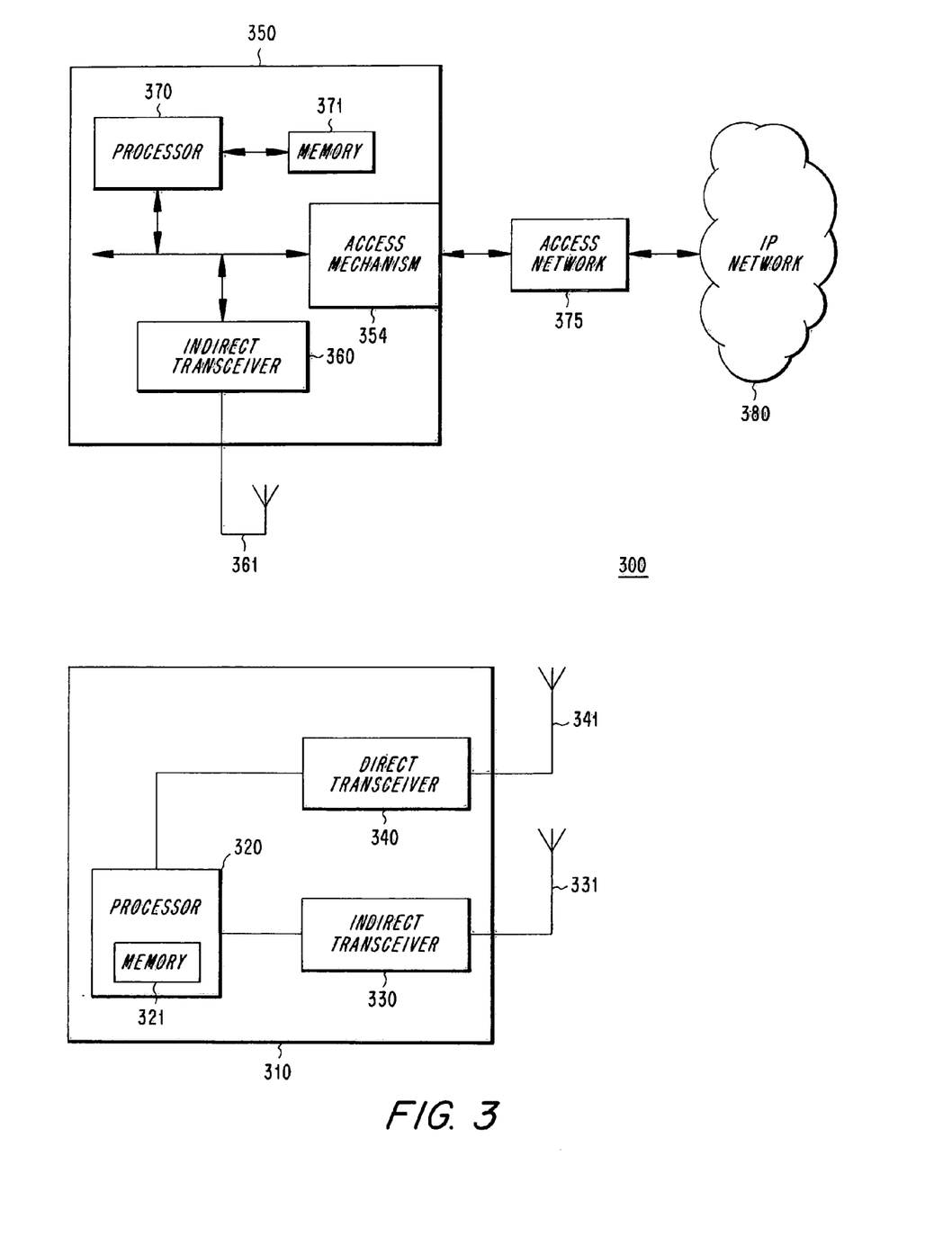
FIG. 3 is a hardware block diagram illustrating an exemplary end device and an exemplary access network terminating device in accordance with the present invention.

An exemplary hardware block diagram is illustrated in FIG. 3 in accordance with an exemplary embodiment of the present invention. End device 310, which may correspond to any of the devices illustrated in FIG. 1 (or some other device) that has both a direct and indirect transceiver, and in the exemplary embodiment shown in FIG. 3, may be, for example, a cellular phone. End device 310 may be equipped with direct transceiver 340, and antenna 341 for conducting normal data transfer using, e.g., a cellular interface having traffic and control channels in accordance with known air interface standards and cellular telephone practices. Indirect transceiver 330 with antenna 331 may form a portion of indirect interface 300 and is preferably the only interface required to connect with the network terminating devices which can be used to connect end device 310 with IP network 380. Processor 320 may be configured to conduct steps such as, for example, device discovery, access discovery, access selection and the collection of user preferences. User preferences may be obtained in a number of ways e.g., via voice or key input, as would be apparent to one skilled in the art and may further be stored in memory 321.

In network terminating device 350, which includes, for example, a fixed portion of indirect interface 300 and can be located in a mall, there will be another indirect transceiver 360 for communicating with the indirect transceiver 330 in the end device 310. The transceiver 360 may be configured to communicate via antenna 361 over an air interface to indirect transceiver 330 in end device 310 to establish device discovery, access discovery, and configuration as previously described with reference to FIG. 2. Processor 370 of device 350 communicates with access mechanisms 354, which represents the various structure and/or circuitry need to interface with the access network 375. For example, if the access network 375 is a wireline, telephone network (PSTN), then the access mechanism 354 can be implemented as a telephone modem. Information regarding potential access to IP network 380 via access network 375 (e.g., current available bandwidth, average BER, subscription class for which access network 375 is currently accepting connections, etc) may be obtained by processor 370 continuously or periodically via access mechanism 354 and stored in memory 371. Although only one network terminating device 350 is illustrated in FIG. 3 to simplify the figure, it will be appreciated that, in practice, end device 310 is expected to be within range of more than one network terminating device 350 at some times.

Figure 4:
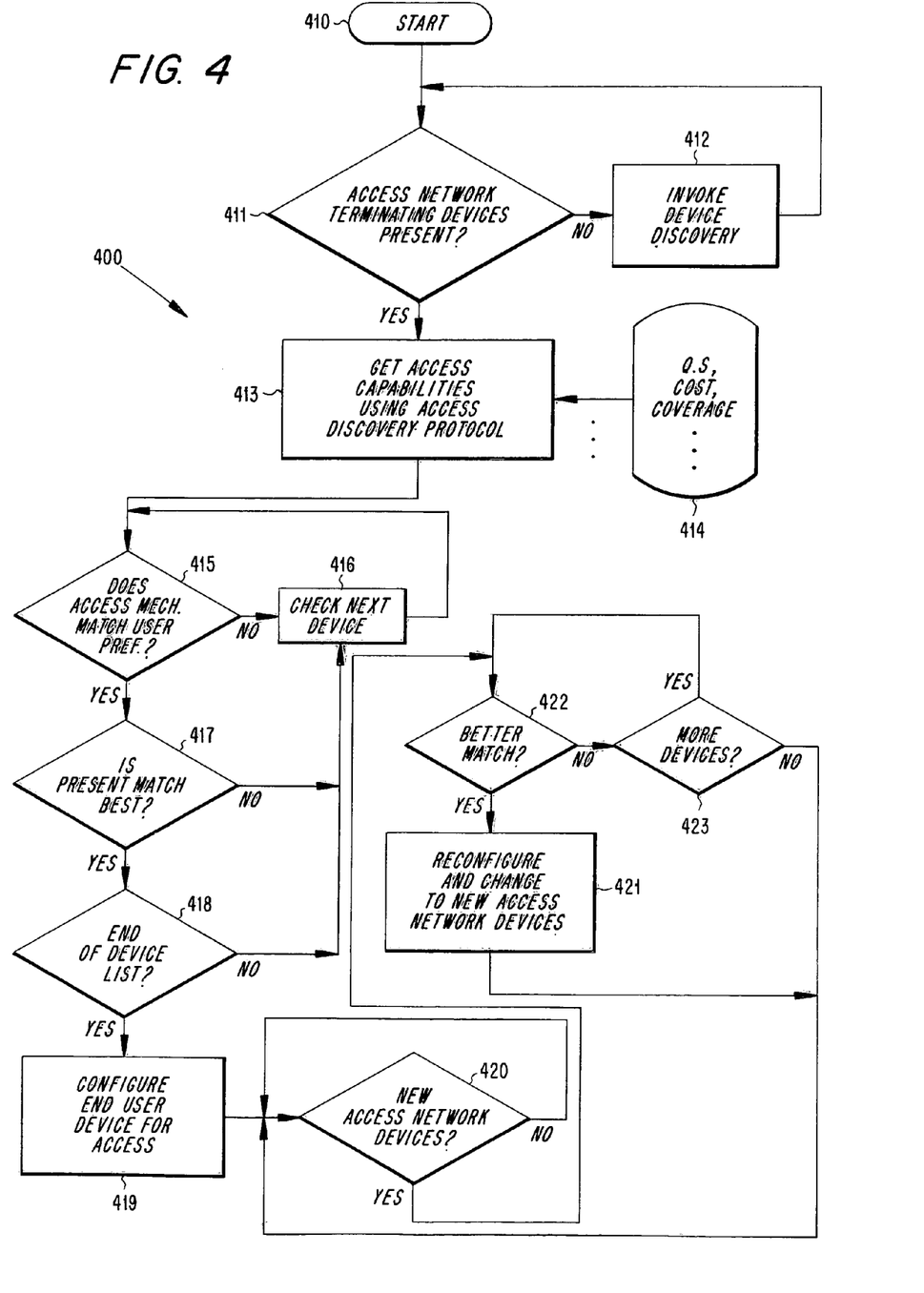
FIG. 4 is a flowchart illustrating exemplary steps including device discovery, access discovery, access selection, and access configuration in accordance with the present invention.

To better understand an exemplary process by which selective access may be practiced, FIG. 4 may be referred to which illustrates an exemplary flowchart in accordance with the present invention. When an end device, such as exemplary end device 310, or any end device as illustrated in FIG. 1–FIG. 3 wants access to, for example, an IP network, it has to first find out if such access is possible based on whether there are any access network terminating devices available, such as, for example, access network terminating device 354. From start block 410, decision block 411 may represent such a process by which an end device determines whether there are any access network terminating devices present. As mentioned earlier, this may include actively polling network terminating devices by transmitting a request and/or listening for announcements that are periodically transmitted by the network terminating devices. If no network terminating devices are located, then block 412 represents a network terminating device discovery process which loops back to continue to poll or listen for network terminating devices.

If one or more network terminating devices are detected, then the end device may determine the identity of the access mechanism and associated access capabilities of the access network terminating devices as represented in block 413, based on information, such as that provided, for example, in information exchange 230 described with reference to FIG. 2. In order to ultimately select which access network terminating device(s) to use if there are several available, or to determine whether to use an access network terminating device or not if there is only one, the end device obtains information about the access network terminating device, its associated access network and their cumulative or respective access capabilities. Such information may include, for example, the cost of access, bandwidth available, QoS parameters, priority level available, delay and the like as illustrated in block 414. Thus, the phrase "access capabilities" as it is used herein refers to one or more of these (and other factors) associated with the access network terminating device, its corresponding access network, both the access network terminating device and its corresponding access network, or any other network components which may impact the parameter(s) of interest to the end device with respect to a potential connection with the ultimate network.

If the network terminating devices are broadcasting announcements that indicate their presence to end devices, then these announcements may include access capability information associated therewith. The announcement may include information regarding all of the access parameters of interest, or may include information regarding only a subset of the access parameters which are more commonly included in the user preferences stored in memory 321. If the announcement does not include sufficient information for the end device to make a selection based upon the selection function performed by processor 320, then the end device sends another request to the network terminating device as part of step 412.

If the kind of access mechanism provided and associated access capabilities favorably compare to that established by, for example, user preferences 211, which comparison is represented in block 415, then a second comparison may be made in block 417 to determine if the present match is the best match of all available access network terminating devices. If the access mechanism does not favorably compare, then as represented by block 416, the next device, if any, is checked. In any case, all available access network terminating devices are checked until the one with the most favorable comparison to user preferences 211 is found. It should be noted that the basis for comparison may be established such that even in the event that none of the available access network terminating devices exactly meets the criteria established by user preferences 211, that some selection may be made, or in the alternative one of the user preferences may specify that an exact match must be made. Accordingly, the choice of how to select from available access network terminating devices will be made based on individual preferences. For example, "best" access may, for one user, be the cheapest access mechanism, or, for a different user, it might be the fastest access mechanism.

As is represented in block 419, a configuration step may be performed once a "best access" match is found in accordance with the above described procedure and the description of configuration information exchange 240 described above with reference to FIG. 2. After configuration step 419 is complete, access may be completed and communication with network 150 may begin. It should be noted that in order to ensure that the "best" access is provided continuously or nearly continuously, a periodic search may be made for available access network terminating devices as represented by step 420. Even after the end device has chosen one network terminating device to use, it can continue to look for other available network terminating devices. If a new network terminating device is a better "best access" match than the one currently used, as represented by decision block 422, the end device may reconfigure and change to the new access network terminating device as represented by block 421. A hysteresis value can be used to avoid "ping-ponging" between network terminating devices which have similar match values with respect to a particular end device's selection algorithm.

If there are more devices to check, all devices should be checked first in the event there is a better match than the present new network terminating device as represented in block 423. If no more network terminating devices are present and the present new network terminating device is not a better "best access" match, the process may be returned to block 420 to continuously look for new devices. It is to be noted that in accordance with an exemplary embodiment of the present invention, the selection of an access network terminating device should be an automatic process. Likewise, the necessary configuration needed to use the specific access should also be done automatically in a manner as would be known to one skilled in the art.

The invention has been described with reference to a particular embodiment. However, it will be readily apparent to those skilled in the art that it is possible to embody the invention in specific forms other than those of the preferred embodiment described above. For example, although network access has been described in these exemplary embodiments as providing a direct path from an end device through a network terminating device and access network to an ultimate (IP) network of interest, those skilled in the art will appreciate that intermediary nodes or networks may be present.

Moreover, end devices having both a direct and indirect interface may operate as both an end device and a network terminating device. Consider that, once such an end device becomes connected to the IP network it is, itself, a termination of the linked networks. Since this connected end device is communicating with the IP network using its indirect interface, it may act as a network terminating device if its primary interface is not being used for some other purpose. Consider the foregoing example wherein the end device is a cellular phone having, as its indirect interface, a Bluetooth transceiver. If the user of the cellular phone is browsing the worldwide web using its Bluetooth transceiver, its direct (cellular) transceiver may be idle and, therefore, available for some other end device to connect with to reach the Internet. Thus, the cellular phone would also have a set of access capabilities which would reflect its ability to act as a conduit for the second end device.

Thus, it can be seen that these exemplary embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method of selectively accessing an Internet Protocol (IP) network utilizing an end device that includes an indirect interface capable of communicating with one or more access network terminating devices, each said access network terminating device being coupled to an associated access network that is further coupled to the IP network, the method comprising the steps of:

determining whether the end device has access to said IP network;

confirming the availability of said one or more access network terminating devices;

determining the access capability of each of said one or more access network terminating devices and ranking said access capability according to one or more predetermined factors;

comparing the determined access capability for each of said one or more access network terminating devices to said access network with a preferred access capability being associated with said end device;

selecting at least one of said one or more access network terminating devices having the highest ranking access capability to provide an optimum connection between said end device and said access network;

subsequent to connecting to said at least one of said one or more access network terminating devices, polling said indirect interface to detect if one or more new access network terminating devices are available to said end device;

determining an access capability for each of the detected one or more new access network terminating devices; and comparing said access capability for each of the detected one or more new access network terminating devices with said preferred access capability of said end device to determine whether said detected one or more new access network terminating devices can improve the current connection of said end device to said access network.

2. The method of claim 1, further comprising the step of configuring said end device according to the access capability of the selected at least one of said one or more access network terminating devices.

3. The method of claim 1, wherein said predetermined factors of said one or more access network terminating devices comprise cost of access, coverage area, bandwidth delay, priority level and Quality of Service (QoS).

4. The method of claim 1, further comprising the steps of:

selecting one of the one or more new access network terminating devices based on the comparison; and configuring said end device according to the access capability of the selected one of the one or more new access network terminating devices.

5. A system for providing selective access to an Internet Protocol (IP) network comprising:

an indirect interface included in an end device for connecting said end device to at least one access network terminating device;

an access network connected to said at least one access network terminating device, wherein said at least one access network terminating device is coupled to an associated access network that in turn is connected to said IP network;

means incorporated in said end device for:
  detecting said at least one access network terminating device;
  determining an access capability of said at least one access network terminating device to said IP network, said access capability comprising one or more predetermined factors;
  comparing said one or more predetermined factors to preferred predetermined factors associated with said end device; and
  selecting at least one preferred access network terminating device according to said comparison;

means for polling to detect if one or more new access network terminating devices are available to said end device;

means for determining an access capability for each of the one or more new access network terminating devices if detected; and means for comparing said access capability for each of the one or more detected new access network terminating devices with a preferred access capability of said end device to determine whether said detected new access network terminating devices can improve the current connection to said network.

6. The system of claim 5, wherein said predetermined factors include cost of access, coverage area, and Quality of service (QoS).

7. The system of claim 5, wherein said preferred predetermined factors include one or more of: cost of access, coverage area, and QoS.

8. The system of claim 5, further comprising means for configuring the end device according to the access capability of the selected one of the one or more new access network terminating devices.

9. The system of claim 8, wherein said end device is a cellular telephone.

10. The system of claim 9, wherein said cellular telephone includes, as a direct interface, means for communicating over a cellular air interface and includes, as said indirect interface, means for communicating over a Bluetooth air interface, wherein said Bluetooth air interface is associated with each of said access network terminating devices.

11. An end device for connecting to an Internet Protocol (IP) network, comprising:
  means for storing a preferred access capability for said end device, said access capability comprising predetermined factors;
  means for communicating with at least one access network terminating device over an indirect interface that is included in said end device, each said access network terminating device being communicably coupled to an associated access network and each said access network being communicably coupled with said IP network;
  means for comparing said stored preferred access capability to an access capability of each of said at least one access network terminating devices;
  means for selecting a preferred access network terminating device, according to said comparison, to provide an optimum connection to said access network;
  means for polling, via the indirect interface, to detect if one or more new access network terminating devices are available to said end device;
  means for determining an access capability for each of the one or more new access network terminating devices; and
  means for comparing said access capability for each of the one or more detected new access network terminating devices with said preferred access capability of said end device to determine whether said detected new access network terminating devices can improve the current connection to said network.

12. The end device of claim 11, wherein said indirect interface is a Bluetooth interface.

13. The end device of claim 11, wherein said predetermined factors comprise one or more of:
  cost of access,
  coverage area,
  bandwidth delay,
  priority level and
  Quality of Service (QoS).

14. The end device of claim 11, further comprising means for communicating over a direct interface.

15. The end device of claim 14, wherein said end device can communicate simultaneously over said direct interface and said included indirect interface.

16. The end device of claim 14, wherein said direct interface is a cellular interface.

* * * * *

UNITED STATES PATENT AND TRADEMARK OFFICE
CERTIFICATE OF CORRECTION

PATENT NO.        : 6,965,948 B1
APPLICATION NO.   : 09/438431
DATED             : November 15, 2005
INVENTOR(S)       : Mats Eneborg et al.

It is certified that error appears in the above-identified patent and that said Letters Patent is hereby corrected as shown below:

In Column 2, Lines 22-23, after "Schulzrinne" delete ", (http://www.cs.columbia.edu/-maria/nossdav99 final.ps)".

Signed and Sealed this

Twenty-seventh Day of November, 2007

JON W. DUDAS
*Director of the United States Patent and Trademark Office*